US011207945B2

United States Patent
Jiang et al.

(10) Patent No.: US 11,207,945 B2
(45) Date of Patent: Dec. 28, 2021

(54) FLOW CONTROL DEVICE, AND CONTROL SYSTEM AND CONTROL METHOD THEREFOR

(71) Applicant: Zhejiang Sanhua Intelligent Controls Co., Ltd., Shaoxing (CN)

(72) Inventors: Huayuan Jiang, Zhejiang (CN); Xuexia Gong, Zhejiang (CN); Yaoyao Zhang, Zhejiang (CN); Zhi Wu, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 176 days.

(21) Appl. No.: 16/465,075

(22) PCT Filed: Nov. 29, 2017

(86) PCT No.: PCT/CN2017/113452
§ 371 (c)(1),
(2) Date: May 29, 2019

(87) PCT Pub. No.: WO2018/099379
PCT Pub. Date: Jun. 7, 2018

(65) Prior Publication Data
US 2019/0283534 A1    Sep. 19, 2019

(30) Foreign Application Priority Data
Dec. 1, 2016    (CN) .......................... 201611087286.7

(51) Int. Cl.
*B60H 1/00*    (2006.01)
*H02P 6/16*    (2016.01)
(Continued)

(52) U.S. Cl.
CPC ..... *B60H 1/00814* (2013.01); *B60H 1/00485* (2013.01); *F16K 11/074* (2013.01);
(Continued)

(58) Field of Classification Search
CPC ... B60H 1/00814; B60H 1/00485; H02P 6/16; H02P 29/024; F16K 31/535;
(Continued)

(56) References Cited

U.S. PATENT DOCUMENTS 5,992,459 A    11/1999    Sugita et al.
6,304,077 B1 *  10/2001    Sorsa ................... F16K 31/046
                                                                318/594
(Continued)

FOREIGN PATENT DOCUMENTS

CN    103782074 A    5/2014
CN    204985849 U    1/2016
(Continued)

OTHER PUBLICATIONS

Extended European Search Report for European Application No. 17876312.4, dated Jun. 24, 2020.
(Continued)

*Primary Examiner* — Jessica Cahill
*Assistant Examiner* — Patrick C Williams
(74) *Attorney, Agent, or Firm* — Wolf, Greenfield & Sacks, P.C.

(57) ABSTRACT

A flow control device for use in a heat exchange system, including: a housing, a movable valve member and a drive control member, the housing being formed to have a mounting cavity, a first interface and a second interface, while the drive control member includes a control unit, a power output unit, a magnetic element and a detection element; the power output unit provides power to the movable valve member, while the detection element and the control unit are electrically connected, and the magnetic element and the power output unit are mutually assembled and oppositely fixed, the power output unit may drive the magnetic element to rotate; the detection element and the magnetic element are oppo-
(Continued)

sitely disposed, the detection element being located within the range of the magnetic field of the magnetic element, the detection element may sense a magnetic pole change of the magnetic element.

18 Claims, 5 Drawing Sheets

(51) Int. Cl.
*F16K 31/53* (2006.01)
*F16K 11/074* (2006.01)
*F16K 31/04* (2006.01)
*F16K 37/00* (2006.01)
*G05D 7/06* (2006.01)
*F25B 41/20* (2021.01)
*F16K 11/24* (2006.01)
*G01D 5/245* (2006.01)
*H02P 29/024* (2016.01)
*F01P 7/14* (2006.01)

(52) U.S. Cl.
CPC ............ *F16K 11/24* (2013.01); *F16K 31/042* (2013.01); *F16K 31/046* (2013.01); *F16K 31/535* (2013.01); *F16K 37/0033* (2013.01); *F25B 41/20* (2021.01); *G05D 7/06* (2013.01); *G05D 7/0635* (2013.01); *H02P 6/16* (2013.01); *F01P 2007/146* (2013.01); *G01D 5/2451* (2013.01); *H02P 29/024* (2013.01)

(58) Field of Classification Search
CPC .... F16K 31/042; F16K 31/046; F16K 11/074; F16K 11/24; F16K 37/0033; G05D 7/0635; G05D 7/06; G01D 5/2451; F01P 2007/146; F25B 41/20
See application file for complete search history.

(56) References Cited

U.S. PATENT DOCUMENTS

| | | | |
|---|---|---|---|
| 6,460,567 B1 | 10/2002 | Hansen, III et al. | |
| 6,745,996 B1* | 6/2004 | Guthrie | F16K 11/074 137/624.12 |
| 2002/0121618 A1 | 9/2002 | Williges | |
| 2012/0304964 A1* | 12/2012 | Nemoto | F02D 9/10 123/399 |
| 2013/0147466 A1* | 6/2013 | Baek | F02D 9/105 324/207.2 |
| 2013/0314239 A1* | 11/2013 | Clark | F16K 37/0041 340/686.6 |
| 2014/0238073 A1 | 8/2014 | Ohno et al. | |
| 2014/0326046 A1* | 11/2014 | Zhang | G01N 33/0009 73/31.04 |
| 2015/0204457 A1* | 7/2015 | Jordan | A61N 1/0556 340/539.1 |
| 2016/0319952 A1* | 11/2016 | Geffert | F16K 11/076 |
| 2017/0074158 A1* | 3/2017 | Nowak | F16K 31/043 |

FOREIGN PATENT DOCUMENTS

| | | |
|---|---|---|
| DE | 10 2006 026 537 A1 | 12/2007 |
| EP | 2 816 270 A2 | 12/2014 |
| EP | 3 502 531 A1 | 6/2019 |
| GB | 2 525 866 A | 11/2015 |
| JP | H10-9416 A | 1/1998 |
| JP | 2001-004052 A | 1/2001 |
| JP | 2003-329698 A | 11/2003 |
| WO | WO 2014/072378 A1 | 5/2014 |

OTHER PUBLICATIONS

International Search Report and Written Opinion for International Application No. PCT/CN2017/113452, dated Feb. 24, 2018.

* cited by examiner

FLOW CONTROL DEVICE, AND CONTROL SYSTEM AND CONTROL METHOD THEREFOR

This application is a National Phase entry of PCT Application No. PCT/CN2017/113452, filed on Nov. 29, 2017, which claims priority to Chinese Patent Application No. 201611087286.7, titled "FLOW CONTROL DEVICE, AND CONTROL SYSTEM AND CONTROL METHOD THEREFOR", filed on Dec. 1, 2016 with the State Intellectual Property Office of People's Republic of China. The entire contents of these applications are incorporated herein by reference in their entireties.

FIELD

The present application relates to an electronically controlled flow control device, and a control system and a control method therefor.

BACKGROUND

The electric vehicle thermal management system includes a coolant circulation system, which consists of a heat exchanger, a power electronic, a drive motor, an on-board charger, a water-storage kettle, an electric water pump, a reversing valve, a high temperature area of a radiator tank, a high pressure PTC heating device and an air conditioner radiator. A reversing device is circularly connected through a pipeline and can be used for switching the flow direction of the coolant. For instance, a hybrid car is usually provided with the PTC heating device to make up for the lack of residual heat of the engine. In this case, it may be required to switch the coolant to the PTC heating device. In the process of switching to the PTC heating device, a reversing valve is also required to switch the flow direction of the coolant.

Currently, the coolant reversing device such as a motor-driven piston valve is very widely applied in the hybrid and pure electric vehicle industries. The piston valve is provided with a valve core assembly in its valve body, and the valve core assembly is connected with a gear decelerating mechanism through a valve core shaft. When driven by the motor, the gear decelerating mechanism drives the valve core assembly to perform reciprocating linear movement to change a sealing position. However, a seal ring used in the piston valve is made of rubber material, which is easily over-deformed or damaged under the squeezing of the movable valve core. Therefore, after a period of use, the movable valve core is easily blocked to stop moving, which affects the normal operation of the piston valve in the system.

SUMMARY

It is an object of the present application to provide a flow control device which is capable of detecting the operation state in a real-time manner.

To achieve the above object, the flow control device according to the present application adopts the following technical solution. A flow control device includes a housing, a valve body member and a drive control component. The housing includes a first port and a second port, and the valve body member is partially received in the housing. The valve body member at least includes a movable valve member and a transmission part, the movable valve member is connected with the transmission part in a position-limited manner, and the movable valve member is movably arranged relative to the housing. The drive control component includes a control unit, a power output unit, a magnetic element and a detection element, where the power output unit is connected with the transmission part in a position-limited manner, the power output unit provides a driving force for the transmission part and the movable valve member, and the detection element is electrically connected with the control unit. The magnetic element is assembled with and is fixed relative to the power output unit. A sensing part of the detection element is located within the magnetic field of the magnetic element and is disposed opposite to an outer periphery of the magnetic element. The detection element is capable of sensing a magnetic pole change generated by rotation of the magnetic element.

The present application also discloses a control system for the flow control device, which at least includes a magnetic element, a detection element and a control unit. Driven by the power output unit of the flow control device, the magnetic element is capable of performing circular motion. The magnetic element includes at least one pair of magnetic poles, each pair of magnetic poles includes an N pole and an S pole, which are disposed at an interval along the circumferential direction of the power output unit. When the magnetic element performs circular motion, the magnetic poles sequentially pass through a sensing area of the detection element. The detection element can interact with the magnetic pole of the magnetic element, to detect a feedback signal. The control unit is provided with a set comparison upper limit, and is configured to compare the detected feedback signal with the set comparison upper limit, and determine whether the power output unit operates normally, and control the power output unit to adjust.

The present application also discloses a control method for the flow control device. The flow control device is provided with the control unit, the power output unit, the magnetic element and the detection element which cooperate to detect and/or control the flow control device. The magnetic element is fixedly arranged relative to the power output unit, and the magnetic element includes at least two magnetic poles. The control method includes the following steps: the stepping motor operating to drive the magnetic element to rotate; the detection element sensing the magnetic pole change of the magnetic element and forming a feedback signal; the control unit collecting the feedback signal in a real-time manner and obtaining the operation duration of the feedback signal; and the control unit determining whether the stepping motor is stalled according to the operation duration of each collected feedback signal, sending out a stalling alarm signal if determining that the stepping motor is stalled, and determining that the stepping motor operates normally and continuing to perform one of the above steps if determining that stepping motor is not stalled, where the detection element senses the magnetic pole change of the magnetic element and generates the feedback signal.

In the technical solution of the present application, the magnetic element and the power output unit are mutually assembled and are fixed relative to each other, and the power output unit drives the magnetic element to rotate, and the detection element is disposed opposite to the magnetic element. The sensing part of the detection element is located within the magnetic field of the magnetic element, and the sensing part and the outer periphery of the magnetic element are oppositely disposed, and the detection element is capable of sensing a magnetic pole change of the magnetic element, so that the control unit can obtain the operation state of the movable valve member.

DETAILED DESCRIPTION OF EMBODIMENTS

Figure 1:
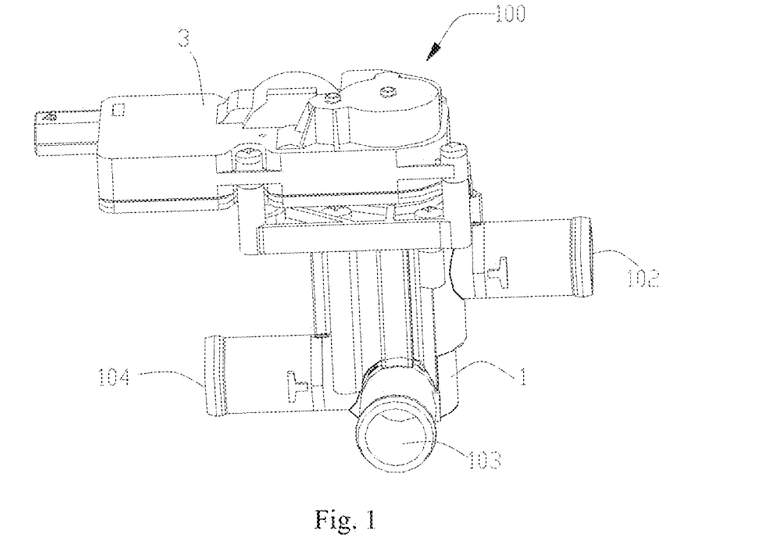
FIG. 1 is a schematic perspective assembly view of a flow control device.
Figure 2:
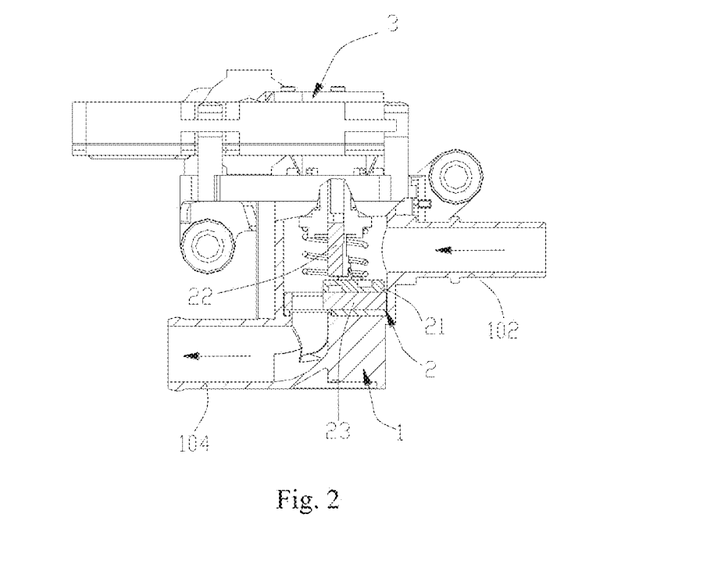
FIG. 2 is a partially sectional view of the flow control device shown in FIG. 1.
Figure 3:
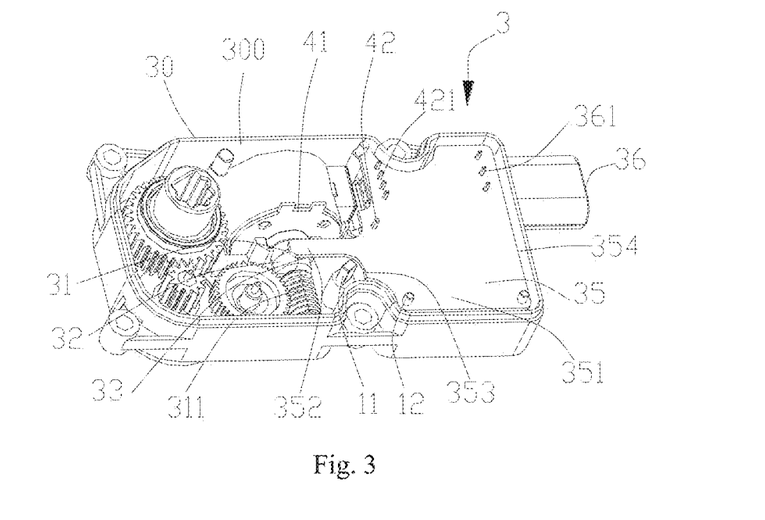
FIG. 3 is a perspective assembly view of some components of the flow control device shown in FIG. 1, and schematically shows the assembly of a drive control component and a transmission system.
Figure 4:
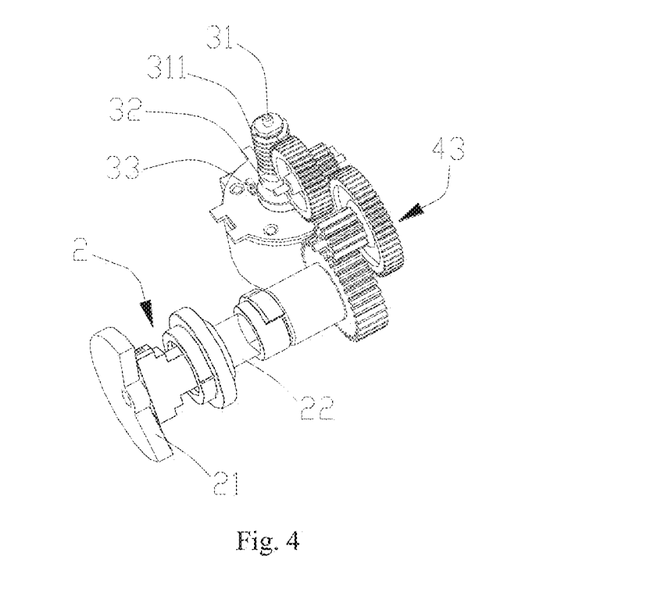
FIG. 4 is a schematic perspective view of a valve body assembly, a power output unit and a transmission system of the flow control device shown in FIG. 1.
Figure 5:
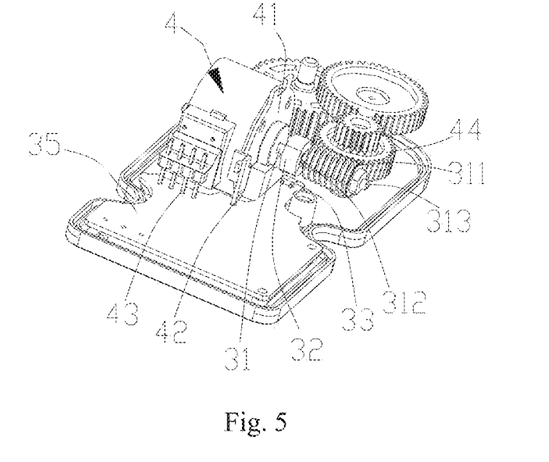
FIG. 5 is a perspective assembly view of some components of the flow control device shown in FIG. 1 and schematically shows the assembly of a drive control component and a transmission system.
Figure 6:
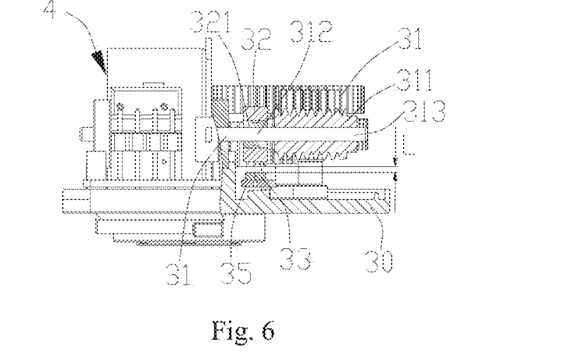
FIG. 6 is a partially sectional view of the flow control device shown in FIG. 5 and schematically shows the relationship of the drive control component.
Figure 7:
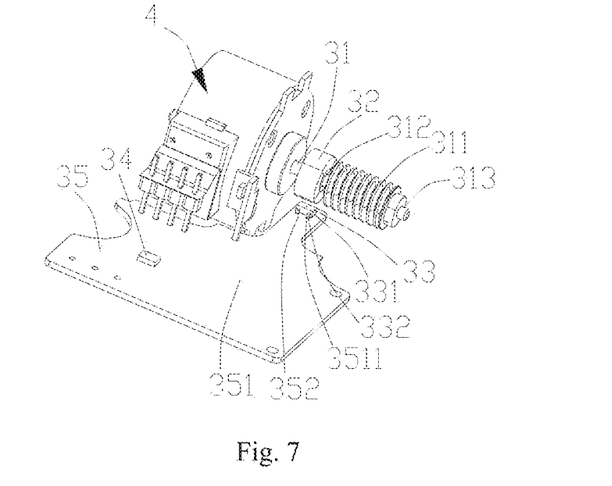
FIG. 7 is a perspective assembly view of some components of the flow control device shown in FIG. 5 and schematically shows the assembly of the drive control component.
Figure 8:
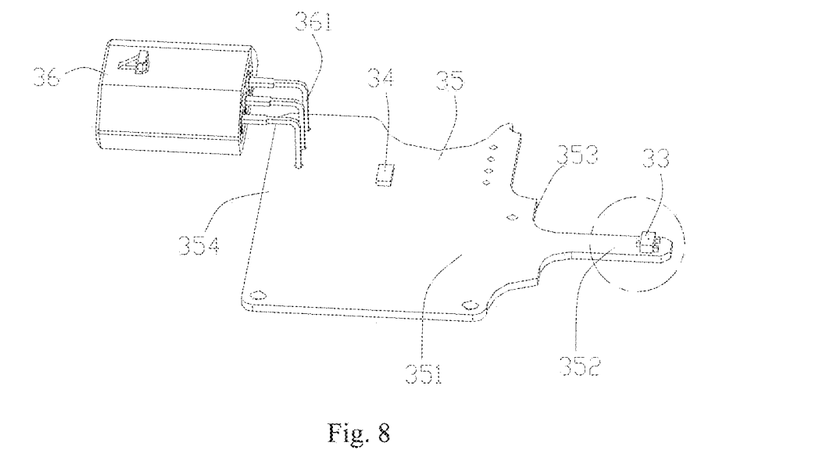
FIG. 8 is a schematic assembly view of the printed circuit board and related electronic components shown in FIG. 3.

Referring to FIG. 1 and FIG. 2, a flow rate control device 100 may be applied to a heat exchange system, for example, an automotive air conditioning system or a domestic air conditioning system. A flow medium of the flow rate control device may be water, a mixture medium of water and other liquids, or a cooling medium having heat-conduction capacity. The flow rate control device 100 is configured to control distribution of the flow medium, and perform heat exchange between the flow medium and other working medium of the heat exchange system, and further to control a medium flow rate of a flow path of the heat exchange system by regulating a flow rate distributed to a medium outlet of the flow rate control device, thereby improving and optimizing a control performance of the flow path of the heat exchange system. Specifically, the flow rate control device 100 can be applied to an air conditioner of the new energy vehicle such as a heating ventilation air conditioner, a battery cooling system or a battery heating system. The flow rate control device 100 is configured to proportionally distribute the working medium from an inlet to different outlets or switches the working medium between different inlets and outlets through a multi-way structure. The flow rate control device 100 may be arranged in two or more heat exchange system circuits. The flow rate control device 100 can switch a flow path in cooperation with the heat exchange system, and can proportionally distribute flow rates of different flow paths of the heat exchange system.

The flow control device 100 includes a housing 1, a valve body assembly 2, and a drive control component 3. The valve body assembly 2 is at least partially received in a mounting cavity of the housing 1. The valve body assembly 2 includes a movable valve member 21 and a transmission part 22. The movable valve member 21 is arranged movably relative to the housing. In this embodiment, the valve body member 2 further includes a fixed valve member 23, which is fixed and sealed relative to the housing, and the movable valve member 21 is sealed relative to the fixed valve member 23. Specifically, the movable valve member is a movable valve plate, and the fixed valve member is a fixed valve plate or is formed by a part of the housing. Herein, the terms "fixed" and "movable" are both defined relative to the housing, and under the "fixed" condition, slight shaking is also permitted. The housing 1 further includes at least two ports. Specifically, the housing in this embodiment includes three ports: a first port 102, a second port 103 and a third port 104. When driven by the transmission part, the movable valve member 21 can open or close a flow channel between the first port and the second port. One of the first port 102 and the second port 103 is an inlet and the other is an outlet, thus realizing a control mode of one input and one output. The housing may also include three or more ports for realizing control modes of one input and two outputs, two inputs and multiple outputs, and/or two inputs and one input, three inputs and two outputs. The drive control component 3 drives the transmission part 22, and the transmission part 22 brings the movable valve member 21 to rotate. During the rotation of the movable valve member, the communication between adjacent ports can be achieved through a communication port of the movable valve member 21. The flow rate of the port can also be controlled by controlling a rotation angle of the movable valve member, so that the flow rate control and reversing of the working medium can be realized by rotating the movable valve member, thus the flow control device 100 is multipurpose and thus can be universally applied.

As shown in FIG. 3 to FIG. 8, the driving control member 3 includes a power output unit 31, a magnetic element 32, a detection element 33, a control unit 34, and a printed circuit board 35. The power output unit 31 is connected to the transmission part 22 in a position-limited manner. The power output unit provides a driving force for the transmission part and the movable valve member. The detection element 33 and the control unit 34 are electrically connected. The flow control device 100 includes a drive shell 30, including a first shell and a second shell which can be connected by welding to form a sealed configuration. The drive shell 30 forms a mounting space 300, and the drive control component 3 is located in the mounting space 300, which facilitates the drive control component to protect against dust and water. The detection element 33 and the control unit 34 are electrically connected to the printed circuit board 35 respectively. Specifically, the detection element 33 and the control unit 34 are welded to the printed circuit board 35 respectively. The magnetic element 32 is fitted with the power output unit 31 and is fixed relative to the power output unit 31. The power output unit can bring the magnetic element to rotate. The detection element 33 is arranged opposite to the magnetic element 32, and is located within a magnetic field range of the magnetic element. The detection element can sense a magnetic pole change caused by the rotation of the magnetic element. Based on a feedback signal which is correspondingly generated due to the magnetic pole change, such as a pulse signal or other periodically changing signals, the control unit can obtain the operation state of the movable valve member. The detection element 33 obtains the feedback signal by sensing the magnetic pole change of the magnetic element 32, the feedback signal corresponds to a position change amount of the magnetic element, so that the detection element 33 provides the detected signal to the control unit. The control unit can receive the feedback signal and determine whether the power output unit operates normally. The printed circuit board 35 includes a main body base 351 and an overhanging portion 352, where the overhanging portion protrudes from one end of the main body base and is overhung. The housing 1 includes first positioning protrusions 11 and a second positioning protrusion 12, where the first positioning protrusions are located on both sides of the overhanging portion 352, and the second positioning protrusion 12 is assembled with the main body base 351 of the printed circuit board. The detection element 33 is assembled on one side of the overhanging portion 352 by welding, and is disposed facing the magnetic element 32. The control unit 34 of the drive control component is secured to the main body base portion 351 by welding. The control unit and the detection element are arranged on the same side of the printed circuit board to facilitate manufacture of the printed circuit board, or the control unit and the detection element are arranged on different sides of the printed circuit board, to relatively reduce the volume of the printed circuit board assembly. The printed circuit board 35 is provided with a printed circuit (not shown), where the printed circuit is electrically connected with the control unit 34 and the detection element 33. The flow control device further includes a signal docking part 36, where a signal terminal 361 of the signal docking part is electrically connected with the printed circuit board 35. Specifically, the printed circuit board 35 includes a first end 353 and a second end 354, the overhanging portion 352 extends outward from the first end and is overhung, and the signal terminal of the signal docking part is welded to the second end 354, thereby establishing an electrical path for the electrical signal transmission between the signal docking part and the printed circuit board.

The flow control device includes a power component. In this embodiment, a stepping motor 4 is used as the power component. The stepping mother is located in the mounting space 300 of the drive shell 30. The control unit 34 acquires an operation signal of the stepping motor, and sends out different control signals to the stepping motor according to the acquired operation signal of the stepping motor, so that the control unit can control the stepping motor. The power member provides power for the stepping motor and the control unit. The control unit may be provided in the flow control device; or the control unit may not be provided in the flow control device but in a main control system to which the flow control device is applied, and the flow control device is provided with a driver that receives a control signal and converts the control signal into a drive signal, which can also achieve the control of the flow control device. The stepping motor includes a motor stator assembly 40 and a motor output shaft, where the motor output shaft protrudes outward from a side of the motor stator assembly, and forms the power output unit 31. That is, the stepping motor 4 provides the power output unit 31. Along the extending direction of the output shaft, the overhanging portion 352 is located on one side of the motor stator assembly 40, and along the radial direction of the motor output shaft, the overhanging portion 352 is located on one side of the outer periphery of the magnetic element. The detection element 33 is fixed on one side of the overhanging portion toward the magnetic element 32, and further is spaced at an induction interval from the outer periphery of the magnetic element, so that the detection element can sense the magnetic pole change of the magnetic element. A sensing part of the detection element 33 is located within the magnetic field of the magnetic element 32, and the sensing part is disposed opposite to the outer periphery of the magnetic element. In a direction perpendicular to a plane where the printed circuit board is located, the projection of the sensing part on the printed circuit board at least partially overlaps with the projection of the magnetic element (specifically, a magnetic ring) on the printed circuit board. Specifically, in the plane of the printed circuit board, the projection of the extending direction of the motor output shaft intersects with the extending direction of the overhanging portion 352, or the projection of the extending direction of the motor output shaft may also be parallel to the extending direction of the overhanging portion 352, thereby meeting the space layout requirements of the components in the shell of the drive control component of the flow control device.

The flow control device further includes a motor assembly, which includes a first grounding element 41 and a second grounding element 42, where the first grounding element and the second grounding element are mutually assembled and fixed, and the second grounding element 42 is welded and electrically connected to the printed circuit board 35. The stepping motor 4 further includes a signal transmission terminal 43, and a tail end of the signal transmission terminal is plugged into the mounting hole of the printed circuit board, such that an electrical control signal can be transmitted to the stepping motor.

Figure 9:
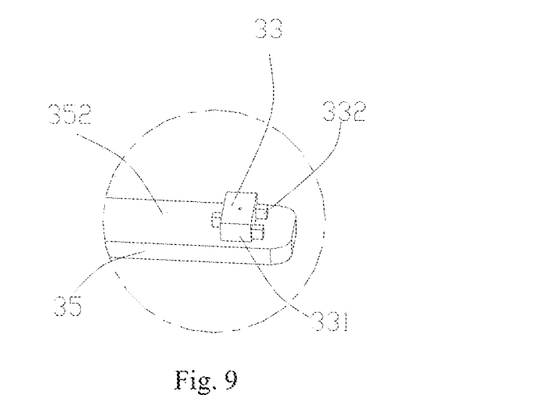
FIG. 9 is a schematic partially-enlarged view of the printed circuit board and the detection element shown in FIG. 8.
Figure 10:
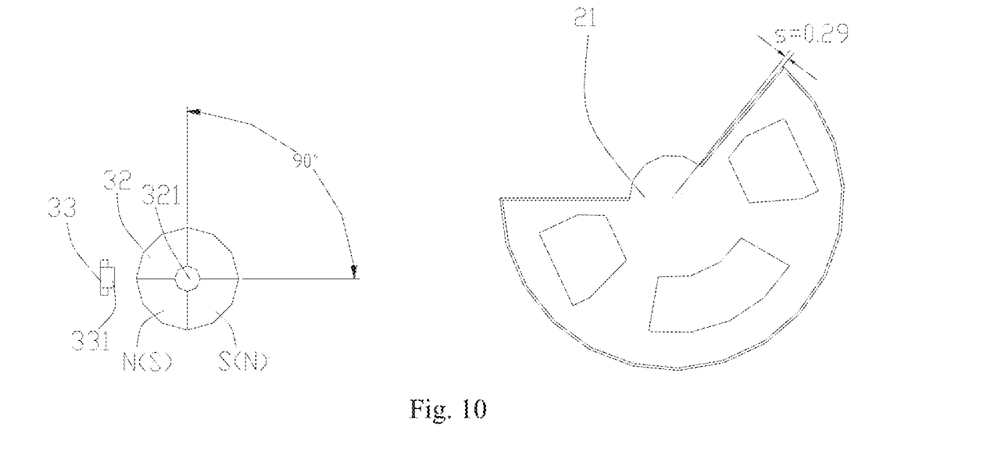
FIG. 10 is a schematic view of the positional relationship between the magnetic element and the detection element shown in FIG. 7, and schematically shows the correspondence relation between the rotation angle of a magnetic element and the rotation angle of a movable valve plate.
Figure 11:
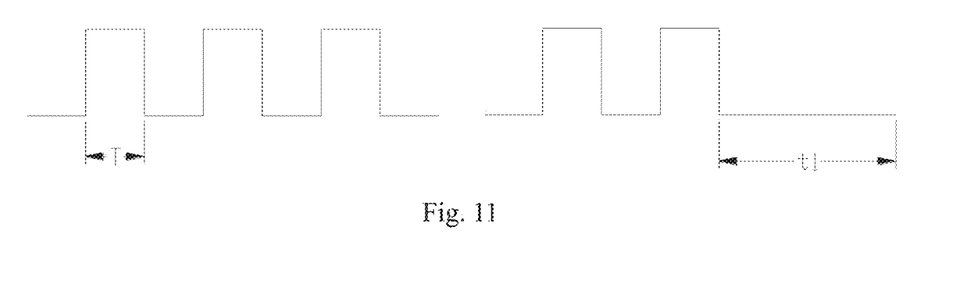
FIG. 11 is a schematic view of a part of feedback signals provided by a detection element of the flow control device to a control unit.

As shown in FIG. 9 to FIG. 11, the power component (stepping motor) drives the power output unit 31 to rotate, the magnetic element 32 rotates along with the power output unit, and the detection element 33 senses the magnetic pole change of the magnetic element 32 to obtain a pulse signal, such that the control unit can obtain the operation state of the movable valve member. By detecting whether a pulse time width of the pulse signal is within the normal operation range, specifically, by detecting whether the pulse time width is greater than an upper limit of the normal operation range, or, by detecting whether a period time width of the periodically changing signal, which is obtained by the detection element 33 sensing the magnetic pole change of the magnetic element, is within the normal operation range, the control unit determines whether the movable valve member of the flow control device is stalled.

The stepping motor 4 is provided with a power output unit, and the magnetic element 32 is mounted on the power output unit. When the stepping motor 4 operates, the power output unit 31 rotates, and the magnetic element 32 rotates along with the power output unit 31. The detection element 33 interacts with the magnetic element 32. The detection element 33 is configured to sense the magnetic field change of the magnetic element 32 and form a pulse signal. The detection element can obtain the pulse signal. It can be determined whether the movable valve member of the flow control device is stalled by detecting the switching interval of the pulse signal. The control unit 34 includes a microprocessor, which is fixed relative to the printed circuit board 35. The microprocessor is configured to collect a feedback signal and determine whether the feedback signal is normal.

The detection element 33 can be a Hall sensor, a position sensor or other position detectors. The feedback signal of the Hall sensor is a Hall signal, and the feedback signal of the position sensor is also a Hall signal. The magnetic element 32 includes at least one pair of magnetic poles. Each pair of magnetic poles includes an N pole and an S pole, and the N pole and the S pole are distributed at an interval along the circumferential direction of the power output unit 31. When each magnetic pole (N pole or S pole) of the magnetic element passes through the Hall sensor, the magnetic pole interacts with the Hall sensor to generate a level signal. High detection accuracy can be realized by combining the Hall sensor and the magnetic pole. The Hall sensor includes a main body 331 and weld legs 332, where the main body 331 is a sensing part for detection, and the weld legs 332 are secured to the printed circuit board 35 and electrically connected to the printed circuit board 35 by welding. Specifically, the printed circuit board 35 is provided with a welding portion 3511 or connection guiding holes, and the welding legs 332 are welded and electrically connected to the printed circuit board by surface mounting technology (SMT), or the weld legs may also pass through the connection guiding holes of the printed circuit board and be welded and electrically connected to the printed circuit board by passing-through-hole mounting.

In this embodiment, the flow control device is provided with a stepping motor, and the magnetic element is a magnetic ring or a columnar magnet. The magnetic element includes 2 N poles and 2 S poles, and the power output unit 31 of the stepping motor is configured as a rotation shaft, which may also be referred to as the motor output shaft and extends outward from the housing of the stepping motor. The magnetic element is assembled with the power output unit, and includes four magnetic poles arranged along the circumference of the power output unit. The Hall sensor is located at the outer periphery of the magnetic element and is disposed close to the magnetic element. When the magnetic element rotates along with the power output unit of the motor, the N poles and the S poles of the magnetic element alternately pass through the Hall sensor, and the Hall sensor generates a periodic feedback signal. The feedback signal is a square wave, once the magnetic pole of the magnetic element passing through the Hall sensor changes from the N pole to the S pole or from the S pole to the N pole, one feedback signal is generated, that is, the feedback signal changes from a low level signal to a high level signal or from a high level signal to a low level signal. When the stepping motor completes one revolution, that is, the magnetic element completes one revolution, 4 feedback signals are generated, and the duration of one magnetic pole passing through the Hall sensor represents the operation duration of the feedback signal. The control unit collects the above feedback signal and determines the operation state of the stepping motor based on the state of the feedback signal. The operation state of the stepping motor at least includes a normal operation state and a stalled state.

The flow control device includes a transmission system 44, and the power output unit 31 includes a worm transmission part 311. The worm transmission part 311 and/or the magnetic element 32 are/is integrally formed with the power output unit 31. Alternatively, the worm transmission part 311 and/or the magnetic element 32 are coaxially sleeved on the outer periphery of the power output unit 31. The power output unit 31 further includes a mounting portion 312, which is assembled with the magnetic element 32, and the magnetic element 32 is provided with a mounting hole 321 matching with the mounting portion, and the mounting portion 312 passes through the mounting hole. The worm transmission part 311 is configured to have a cylindrical shape and is sleeved on the outer periphery of the power output unit. The worm transmission part 311 forms an engagement mechanism with the transmission system 44. The power output unit 31 drives the movable valve member via the transmission system. When the movable valve member rotates by one operation angle, one magnetic pole change of the magnetic element 32 occurs, and the detection element 33 correspondingly generates one level signal, such that the control unit can obtain the operating state of the movable valve member. Specifically, the transmission system 44 is a gear transmission system which transmits the driving force of the stepping motor to the movable valve member 21. In this embodiment, the magnetic element is configured as a magnetic ring or a columnar magnet, and the power output unit of the stepping motor is provided with a mounting shaft portion 313. The worm transmission part 311 forms an engagement mechanism with the transmission system, where the mounting shaft portion 313 is inserted into the mounting hole 321. The worm transmission part 311 is assembled with the mounting shaft portion 313, or the worm transmission part 311 may also be integrally formed with the mounting shaft portion 313.

When each magnetic pole of the magnetic ring 32 passes through the Hall sensor, one level signal is generated. A position detection accuracy s of the flow control device 100 is represented by a rotation angle a of the movable valve member, which can be detected by the Hall sensor, that is, the minimum rotation angle of the movable valve member which can be detected by the Hall sensor. There are two parameters influencing the position detection accuracy s, i.e., a transmission ratio i of the transmission system, and the number of poles M of the magnetic ring. The position detection accuracy s can be expressed by the equation: $s=360/i/m$. For instance, the transmission ratio i is 312, the number of poles M of the magnetic ring is 2 to 10. Given that the number of poles of the magnetic ring is constant, when the transmission ratio i is decreased or increased, the position detection accuracy s increases or decreases correspondingly. Combining these parameters, the detection accuracy of the flow control device is equal to or less than two degrees (2°), which can be further optimized to 1°, and is specifically less than 0.57 degree and greater than 0.14 degree.

Taking a quadrupole magnetic ring as an example, the transmission ratio i of the gear transmission system is 312, one level signal is generated when each magnetic pole of the magnetic ring passes through the Hall sensor. Then, once the stepping motor rotates by one revolution (360°), the movable valve member rotates by 360°/312=1.15°, and the Hall sensor generates four level signals. When the machining precision of the gear transmission system is approximately the same, the position detection accuracy of the transmission output portion or the movable valve member, which can be detected by the Hall sensor, is: 360°/4/312=0.29°, that is, when the number of poles of the magnetic ring corresponding to the level signal, which is generated by the Hall sensor, is 1 (90°), the movable valve member correspondingly rotates by 0.29°. In other words, if the movable valve member rotates by 0.29°, the Hall sensor feeds one level signal back to the control unit of the printed circuit board. That is, the position change of 0.29° of the movable valve member can be detected. Taking the six-pole magnetic ring as an instance, the position detection accuracy of the transmission output portion or the movable valve member which can be detected by the Hall sensor is: 360°/6/312=0.19°. Of course, in other embodiments, the number of poles of the magnetic ring may also be 8 to 10. For instance, for an eight-pole magnetic ring, the position detection accuracy of the Hall sensor is 360°/8/312=0.14°. If the number of poles of the magnetic ring corresponding to each level signal is 1, the correspondingly moving angle of the movable valve member controlled is 0.14° to 0.57°. Therefore, if the movable valve member moves by 0.14° to 0.57°, the Hall sensor generates one level signal correspondingly, so that the position change of two degrees or less of the movable valve member can be detected. By the interaction between the Hall sensor and the magnetic ring arranged on the periphery of the output shaft of the stepping motor, the position detection accuracy of the movable valve member can be greatly improved.

The detection element 33 is spaced apart from the outer periphery of the magnetic element 32 by an induction interval. Particularly, the main body 331 of the detection element 33 is spaced apart from the magnetic element 32 by an induction interval, which is less than 5 mm. The main body of the sensor is located in an area between the printed circuit board and the motor output shaft, which can effectively utilize a spatial position between the components and has little influence on the original structure, and thus is favorable for saving costs. Specifically, in the radial direction of the magnetic element, the outer periphery of the magnetic element 32 is spaced apart from the top of the detection element 33 by a distance L, which is greater than or equal to 2 mm and less than or equal to 3 mm. In this way, the overall height of the printed circuit board and the motor output shaft can be reduced, and the sensitivity of the detection element 33 can be increased.

Figure 12:
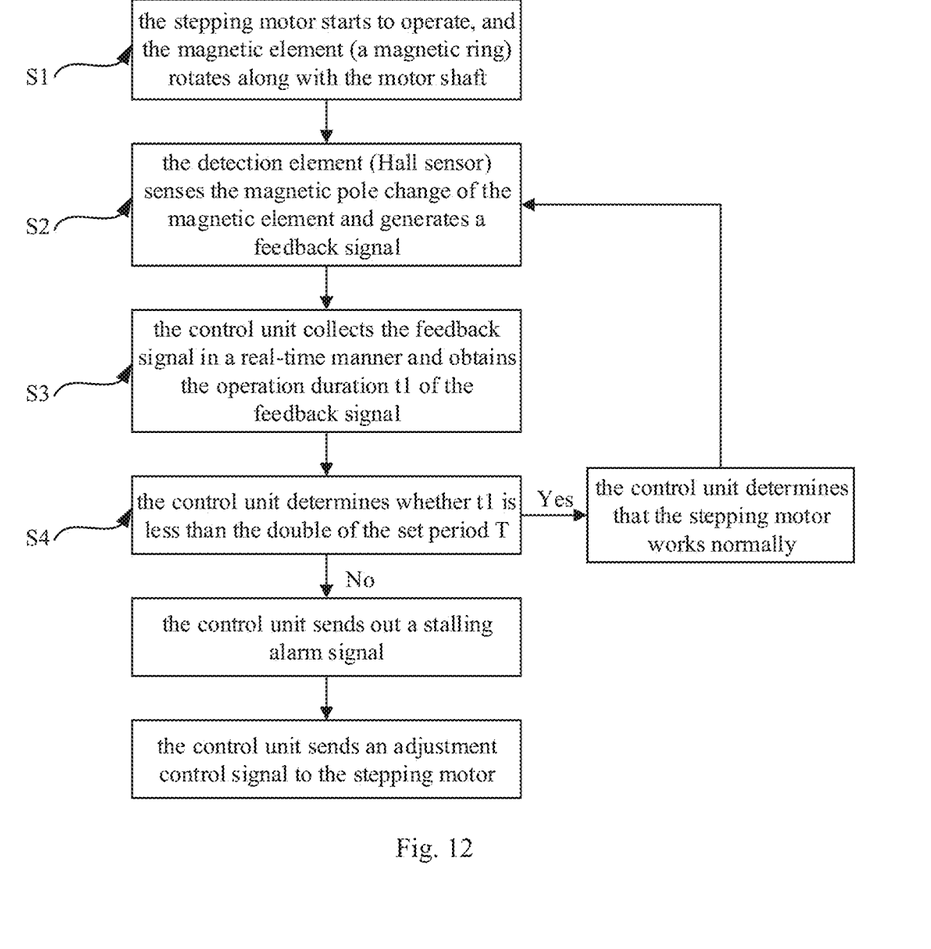
FIG. 12 is a flow chart of a control method for the flow control device.

Specifically, referring to FIG. 10 to FIG. 12, when the flow control solution works normally, the magnetic pole of the magnetic ring corresponding to the sensor rotates from the N pole to a junction between the N pole and the S pole during the operation of the stepping motor, and the corresponding feedback signal is low level. With the operation of the stepping motor, the magnetic pole of the magnetic ring corresponding to the sensor changes from the N pole to the S pole, and the feedback signal jumps to a high level signal. With the stepping motor continuing to operate, the magnetic pole of the magnetic ring corresponding to the sensor rotates from the S pole to the junction between the N pole and the S pole, the feedback signal is maintained at high level. With the operation of the stepping motor, the magnetic pole of the magnetic ring corresponding to the sensor changes from the S pole to the N pole, the feedback signal jumps to a low level signal. The above circulation is repeated. For each revolution of the magnetic ring, 4 feedback signals are generated, and the operation duration of each feedback signal is set as a time width T of the normal operation pulse. When a stalled situation occurs in the flow control solution, the magnetic ring usually does not rotate, so the feedback signal maintains a current state, and the duration t1 for which the high level or the low level signal is maintained exceeds a set normal pulse duration T. Double or other multiples of the set normal pulse duration T may be defined as the set upper limit for comparing with the operation pulse duration t1.

The present application further provides a control system for controlling the flow control device. The control system at least includes a magnetic element 32, a detection element 33 and a control unit 34.

The magnetic element 32 is capable of performing circular motion synchronously with the power output unit 31 of the flow control device. The magnetic element includes at least one pair of magnetic poles, where each pair of magnetic poles includes an N pole and an S pole, the N pole and the S pole are distributed at an interval along the circumferential direction of the power output unit 31. When the magnetic element performs the circular motion, the magnetic poles sequentially pass through the sensing area of the detection element.

The detection element 33 can interact with the magnetic pole of the magnetic element and detect a feedback signal. Specifically, the feedback signal is high-low level signal, a pulse signal or other periodically changing signal;

The control unit 34 is provided with a set comparison upper limit. By comparing the detected feedback signal with the set comparison upper limit, the control unit determines whether the power output unit operates normally, and controls the power output unit to adjust. When the movable valve member of the flow control is stalled, the magnetic ring does not move, no pulse is generated, and the level detected does not change, and at this time the abnormality can be determined. Specifically, when the feedback signal is the high-low level signal/the pulse signal or other periodically changing signals, and the time width of the feedback signal is greater than the comparison upper limit, it can be determined that the movable valve member operates abnormally, such as being stalled, and the power output unit 31 may be controlled to adjust. For instance, the actual operation pulse time width t1 corresponding to the feedback signal detected by the Hall sensor is greater than the double of the normal pulse duration T, and in this case, it is determined that the operation state is abnormal and a stalling occurs.

Referring to FIG. 12 again, the present application further provides a control method for a control system. The control system includes a stepping motor, a control unit, and a sensor, where a power output unit of the stepping motor is provided with a magnetic ring, which includes a plurality of magnetic poles, and specifically includes at least two pairs of magnetic poles. The control method includes the following steps S1 to S4.

In step S1, the stepping motor operates, and the magnetic ring rotates (circular motion).

In step S2, the sensor senses the magnetic pole change of the magnetic ring and generates a feedback signal.

In step S3, the control unit collects the feedback signal in a real-time manner and obtains the operation duration of the feedback signal.

In step S4, the control unit determines whether the stepping motor is stalled according to the operation duration of each collected feedback signal, and sends out a stalling alarm signal if the stepping motor is stalled, and determines that the stepping motor operates normally and the procedure goes to step S2 if the stepping motor is not stalled. The above operation is repeated.

In the above step S4, a set period T is pre-stored in the control unit, and the control unit determines whether the operation duration of each feedback signal is greater than the double of the set period. If the operation duration of each feedback signal is greater than the double of the set period, it is determined that a stalling occurs in the flow control solution, and the control unit sends out a stalling alarm signal.

The flow control device 100 can be applied to the heating ventilation air conditioning of a new energy automobile, and a battery cooling or battery heating system, and specifically, relates to the moving position detection and stalling detection of the movable valve member of the flow control device, the detection element employs the Hall sensor and the magnetic ring which cooperate with each other. The detection element moves synchronously with the power output unit of the motor, and is easily installed and can effectively improve the position detection accuracy. Further, with utilization of the change of the transmission ratio of the transmission system, the position detection accuracy of the movable valve member can be further improved, such that the number of magnetic poles of the magnetic ring can be reduced, the outer diameter of the magnetic ring can be reduced, thereby reducing the volume of the magnetic ring.

It should be noted that the above embodiments are merely for illustrating the present application, but not for limiting the technical solutions described in the present application. Although the present specification describes the present application in detail with reference to the above embodiments, it should be understood that those skilled in the art can still modify or equivalently substitute the present application. All the technical solutions and their improvements which do not depart from the technical essence and scope of the present application, should fall within the scope of the claims of the present application.

The invention claimed is:

1. A flow control device, comprising: a housing, a valve body assembly and a drive control component, wherein the housing comprises a first port and a second port;

the valve body assembly is partially received in the housing and comprises at least a movable valve member and a transmission part, the movable valve member is connected to the transmission part in a position-limited manner, and the movable valve member is movably arranged relative to the housing; and the drive control component comprises a control unit, a power output unit, a magnetic element and a detection element, wherein the power output unit is connected to the transmission part in a position-limited manner, the power output unit provides a driving force for the transmission part and the movable valve member, the detection element is electrically connected with the control unit, the magnetic element is assembled with the power output unit and is fixed relative to the power output unit, a sensing part of the detection element is located within a magnetic field of the magnetic element and is arranged opposite to an outer periphery of the magnetic element, and a magnetic pole change generated by rotation of the magnetic element is sensed by the detection element, wherein the magnetic element is capable of performing circular motion when driven by the power output unit, wherein the magnetic element comprises at least one pair of magnetic poles, each pair of magnetic poles comprises an N pole and an S pole which are distributed at an interval along the circumferential direction of the power output unit, and the magnetic poles sequentially pass through a sensing area of the detection element when the magnetic element performs the circular motion;

the detection element is capable of interacting with the magnetic poles of the magnetic element, to detect feedback signals; and the control unit is provided with a set comparison upper limit and is configured to compare the detected feedback signals with the set comparison upper limit, determine whether the power output unit operates normally, and control the power output unit to adjust.

2. The flow control device according to claim 1, wherein the power output unit is configured to drive the transmission part to rotate, and driven by the transmission part, the movable valve member is capable of opening a flow channel between the first port and the second port; the power output unit is configured to drive the magnetic element to rotate, the detection element is spaced apart from the outer periphery of the magnetic element by an induction interval and obtains the feedback signals by sensing the magnetic pole change of the magnetic element, and the control unit receives the feedback signals and determines whether the power output unit operates normally; and driven by the transmission part, the movable valve member switches to an operation position of closing, and cuts off the flow channel between the first port and the second port.

3. The flow control device according to claim 2, wherein the detection element is spaced apart from the magnetic element by the induction interval, the drive control component comprises a printed circuit board, the detection element and the control unit are electrically connected with the printed circuit board, the flow control device comprises a power component which drives the power output unit to rotate, and the magnetic element rotates along with the power output unit, the detection element senses the magnetic pole change of the magnetic element; and the control unit obtains a pulse signal corresponding to the magnetic pole change according to the magnetic pole change detected by the detection element and detects whether a pulse time width of the pulse signal is within a normal operation range; or the detection elements senses the magnetic pole change of the magnetic element to obtain a periodically changing signal, and determines whether the movable valve member of the flow control device is stalled by detecting whether a period of the periodically changing signal is greater than an upper limit of the normal operation range; and in a direction perpendicular to a plane where the printed circuit board is located, a projection of the sensing part on the printed circuit board at least partially overlaps with a projection of the magnetic element on the printed circuit board.

4. The flow control device according to claim 3, wherein the printed circuit board comprises a main body base and an overhanging portion, the detection element is assembled on one side of the overhanging portion by welding and is disposed facing the magnetic element, the printed circuit board comprises a first end and a second end, the overhanging portion extends outward from the first end and is overhung, the flow control device further comprises a signal docking part, a signal terminal of the signal docking part is electrically connected with the circuit board, and the signal terminal of the signal docking part is assembled to the second end by welding.

5. The flow control device according to claim 4, wherein the detection element and the control unit are respectively secured to the printed circuit board by welding, the printed circuit board comprises a main body base and an overhanging portion, the detection element is assembled on one side of the overhanging portion by welding and is disposed facing the magnetic element, the control unit of the drive control component is welded to the main body base, the control unit and the detection element are arranged on the same side or different sides of the circuit board, the circuit board is provided with a printed circuit electrically connected with the control unit and the detection element, and the detection element is a Hall sensor.

6. The flow control device according to claim 2, wherein
the flow control device comprises a transmission system, the power output unit is provided with a worm transmission part, and the worm transmission part and a transmission input portion of the transmission system form an engagement mechanism, and a transmission output portion of the transmission system and the movable valve member form a mechanical engagement mechanism; and the worm transmission part and/or the magnetic element are/is integrally formed with the power output unit; or the power output unit is provided with a mounting portion which is assembled with the magnetic element, the magnetic element is provided with a mounting hole matching with the mounting portion, and the mounting portion is partially located in the mounting hole.

7. The flow control device according to claim 6, wherein
the power component is a stepping motor, the power output unit drives the magnetic element to rotate and drives the movable valve member via the transmission system;

when the movable valve member rotates by one operation angle, the magnetic element generates one magnetic pole change accordingly, and the detection element generates a level signal; and the drive control component comprises a printed circuit board, the detection element and the control unit are electrically connected with the printed circuit board, the detection element is a Hall sensor which comprises a main body and weld legs, the main body of the Hall sensor is spaced apart from the magnetic element by an induction interval less than 5 mm, the weld legs are electrically connected with the printed circuit board and are secured to the printed circuit board by welding, and a position detection accuracy of the flow control device is equal to or less than two degrees.

8. The flow control device according to claim 7, wherein
the magnetic element is configured to have a ring shape or a columnar shape.

9. The flow control device according to claim 2, wherein
the drive control component comprises a printed circuit board, the detection element and the control unit are secured to the printed circuit board by welding, the printed circuit board comprises a main body base and an overhanging portion, the detection element is assembled on one side of the overhanging portion by welding and is disposed facing the magnetic element, the control unit of the drive control component is welded to the main body base, the control unit and the detection element are arranged on the same side or different sides of the circuit board, the circuit board is provided with a printed circuit electrically connected with the control unit and the detection element, and the detection element is a Hall sensor.

10. The flow control device according to claim 2, wherein
the power component is a stepping motor, the stepping motor comprises a motor stator assembly and a motor output shaft, the motor output shaft protrudes outward from a side of the motor stator assembly and forms the power output unit, and the magnetic element is fixed relative to the motor output shaft; and the drive control component comprises a printed circuit board which comprises a main body base and an overhanging portion, the overhanging portion protrudes from an end of the main body base and extends along an extending direction of the motor output shaft, the overhanging portion is located on one side of the motor stator assembly along the radial direction of the motor output shaft, the overhanging portion is located on one side of the outer periphery of the magnetic element, and the detection element is secured on a side of the overhanging portion facing the magnetic element and is spaced apart from the outer periphery of the magnetic element by the induction interval.

11. The flow control device according to claim 2, wherein
the drive control component comprises a printed circuit board, the detection element and the control unit are respectively secured to the printed circuit board by welding, the flow control device further comprises a motor assembly, which is provided with the power output unit, the motor assembly further comprises a first grounding element and a second grounding element, the first and second grounding elements are assembled with each other, and the second grounding element is electrically connected with the printed circuit board by welding.

12. The flow control device according to claim 2, wherein
the drive control component comprises a printed circuit board, the detection element and the control unit are secured to the printed circuit board by welding, the printed circuit board comprises a main body base and an overhanging portion, the detection element is assembled on one side of the overhanging portion by welding and is disposed facing the magnetic element, the housing comprises first positioning protrusions and a second positioning protrusion, the first positioning protrusions are located on both sides of the overhanging portion, and the second positioning protrusion is assembled with the main body base of the printed circuit board.

13. The flow control device according to claim 1, wherein
the power output unit drives the transmission part to rotate, and driven by the transmission part, the movable valve member rotates, the power output unit drives the magnetic element to rotate, the detection element is spaced apart from the outer periphery of the magnetic element by an induction interval and obtains the feedback signals by sensing a magnetic pole change of the magnetic element, and the control unit receives the feedback signals and determine whether the power output unit operates normally;

the detection element is spaced apart from the magnetic element by the induction interval, the drive control component comprises a printed circuit board, the detection element and the control unit are electrically connected with the printed circuit board, the flow control device comprises a power component which drives the power output unit to rotate, and the magnetic element rotates along with the power output unit; and the detection element senses the magnetic pole change of the magnetic element, the control unit obtains a pulse signal corresponding to the magnetic pole change according to the magnetic pole change detected by the detection element, and detects whether the pulse time width of the pulse signal is within a normal operation range; or the detection elements senses the magnetic pole change of the magnetic element to obtain a periodically changing signal, and it is determined whether the movable valve member of the flow control device is stalled by detecting whether a period of the periodically changing signal is greater than an upper limit of the normal operation range.

14. The flow control device according to claim 1, wherein
the power output unit drives the magnetic element to rotate, the detection element is spaced apart from the outer periphery of the magnetic element by an induction interval, the detection element obtains the feedback signals by sensing the magnetic pole change of the magnetic element, the control unit receives the feedback signals and determines whether the power output unit operates normally, and driven by the transmission part, the movable valve member switches to an operation position of closing and cuts off the flow channel between the first port and the second port; and the flow control device comprises a transmission system, the power output unit is provided with a worm transmission part, the worm transmission part and a transmission input portion of the transmission system form an engagement mechanism, a transmission output portion of the transmission system and the movable valve member form a mechanical engagement mechanism; and the worm transmission part and/or the magnetic element are/is integrally formed with the power output unit; or, the power output unit is provided with a mounting portion which is assembled with the magnetic element, the magnetic element is provided with a mounting hole matching with the mounting portion, and the mounting portion is partially located in the mounting hole.

15. The flow control device according to claim 1, wherein
the power output unit drives the transmission part to rotate, and driven by the transmission part, the movable valve member opens a flow channel between the first port and the second port, the power output unit drives the magnetic element to rotate, and the detection element is spaced apart from the outer peripheral of the magnetic element by an induction interval;

the drive control component comprises a printed circuit board, the detection element and the control unit are secured to the printed circuit board by welding, the printed circuit board comprises a main body base and an overhanging portion, the detection element is assembled on one side of the overhanging portion by welding and is disposed facing the magnetic element, the control unit of the drive control unit is secured to the main body base by welding, the control unit and the detection element are arranged on the same side or different sides of the circuit board, the printed circuit board is provided with a printed circuit electrically connected with the control unit and the detection element, and the detection element is a Hall sensor;

the flow control device comprises a power component, the power component drives the power output unit to rotate, the magnetic element rotates along with the power output unit, the detection element senses the magnetic pole change of the magnetic element; and the control unit obtains a pulse signal corresponding to the magnetic pole change according to the magnetic pole change detected by the detection element and detects whether the pulse time width of the pulse signal is within a normal operation range; or, the detection elements senses the magnetic pole change of the magnetic element to obtain a periodically changing signal, and it is determined whether the movable valve member of the flow control device is stalled by detecting whether a period of the periodically changing signal is greater than an upper limit of the normal operation range.

16. The flow control device according to claim 1, wherein
the power output unit drives the magnetic element to rotate, the detection element is spaced apart from the outer periphery of the magnetic element by an induction interval, the detection element obtains the feedback signals by sensing the magnetic pole change of the magnetic element, the control unit receives the feedback signals and determines whether the power output unit operates normally, and driven by the transmission part, the movable valve member switches to an operation position of closing and cuts off the flow channel between the first port and the second port; and the drive control component comprises a printed circuit board, the detection element and the control unit are secured to the printed circuit board by welding, the printed circuit board comprises a main body base and an overhanging portion, the detection element is assembled on one side of the overhanging portion by welding and is disposed facing the magnetic element, the housing comprises first positioning protrusions and a second positioning protrusion, the first positioning protrusions are located on both sides of the overhanging portion, and the second positioning protrusion is assembled with the main body base of the printed circuit board.

17. A control method for the flow control device according to claim 1, wherein the power output unit of the flow control device is a stepping motor;

the control method comprising: operating the stepping motor to drive the magnetic element to rotate;

sensing, by the detection element, the magnetic pole change of the magnetic element and forming the feedback signals;

collecting, by the control unit, the feedback signals in a real-time manner and obtaining the operation duration of the feedback signals; and determining according to the operation duration of the collected feedback signals, by the control unit, whether the stepping motor is stalled, and sending out a stalling alarm signal if determining that the stepping motor is stalled, and determining that the stepping motor operates normally and continuing to perform one of the above steps if determining that stepping motor is not stalled, wherein the detection element senses the magnetic pole change of the magnetic element and generates the feedback signals.

18. The control method for the flow control device according to claim 17, further comprising:

determining, by the control unit, whether the operation duration of the feedback signals are greater than 2 times of a set period T pre-stored in the control unit; and determining, by the control unit, that a stalling occurs in the flow control solution, and sending out, by the control unit, a stalling alarm signal if determining that the operation duration of the feedback signals are greater than 2 times of the set period T.

* * * * *